US012695324B2

(12) United States Patent
Li et al.

(10) Patent No.: US 12,695,324 B2
(45) Date of Patent: Jul. 28, 2026

(54) CHARGING APPARATUS AND CONTROL METHOD THEREOF, AND ELECTRIC DEVICE AND POWER SUPPLY SYSTEM THEREOF

(71) Applicants: CONTEMPORARY AMPEREX TECHNOLOGY CO., LIMITED, Ningde (CN); CONTEMPORARY AMPEREX INTELLIGENCE TECHNOLOGY (SHANGHAI) LIMITED, Shanghai (CN)

(72) Inventors: Bao Li, Shanghai (CN); Chuanhui Zhang, Shanghai (CN)

(73) Assignees: CONTEMPORARY AMPEREX TECHNOLOGY CO., LIMITED, Ningde (CN); CONTEMPORARY AMPEREX INTELLIGENCE TECHNOLOGY (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 19/066,870

(22) Filed: Feb. 28, 2025

(65) Prior Publication Data

US 2025/0202259 A1 Jun. 19, 2025

Related U.S. Application Data

(63) Continuation of application No. PCT/CN2022/123571, filed on Sep. 30, 2022.

(51) Int. Cl.
*H02J 7/00* (2026.01)
*H02J 7/02* (2016.01)

(52) U.S. Cl.
CPC ................ *H02J 7/865* (2026.01); *H02J 7/02* (2013.01); *H02J 2207/20* (2020.01)

(58) Field of Classification Search
USPC ........................................ 320/128
See application file for complete search history.

(56) References Cited

U.S. PATENT DOCUMENTS 9,246,348 B2 * 1/2016 Solie ......................... H02J 7/04
2012/0086269 A1 * 4/2012 Nakano ................... H02J 9/062
307/23

(Continued)

FOREIGN PATENT DOCUMENTS

CN 101740829 A 6/2010
CN 105790337 A 7/2016

(Continued)

OTHER PUBLICATIONS

Machine Translation of KR101425604B1 (Year: 2014).*

(Continued)

*Primary Examiner* — Samuel Berhanu
(74) *Attorney, Agent, or Firm* — ANOVA LAW GROUP, PLLC

(57) ABSTRACT

A charging apparatus includes a first port electrically connected to a charging port of an electric device that is configured to be electrically connected to an external charging device, a second port electrically connected to a power battery of the electric device, and a third port electrically connected to a first load. The charging apparatus is configured to convert electrical energy input from the charging port or the power battery into a first alternating current, and transmit the first alternating current to the first load.

15 Claims, 4 Drawing Sheets

(56) References Cited

U.S. PATENT DOCUMENTS

| | | | | |
|---|---|---|---|---|
| 2015/0333524 A1 * | 11/2015 | Nishikawa | ............... | H02J 3/32 |
| | | | | 307/26 |
| 2016/0241082 A1 * | 8/2016 | Stoevring | ............... | H02J 9/062 |
| 2018/0323624 A1 * | 11/2018 | Chang | ....................... | H02J 7/06 |
| 2019/0006870 A1 * | 1/2019 | Ishikura | ................... | H02J 3/32 |
| 2022/0115901 A1 * | 4/2022 | Ling | ....................... | H02M 1/32 |

FOREIGN PATENT DOCUMENTS

| | | | |
|---|---|---|---|
| CN | 105790340 A | 7/2016 |
| CN | 108008207 A | 5/2018 |
| CN | 112912272 A | 6/2021 |
| CN | 114336905 A | 4/2022 |
| CN | 115027297 A | 9/2022 |
| EP | 2982545 B1 | 11/2018 |
| EP | 4015290 A1 | 6/2022 |
| JP | 2004159414 A | 6/2004 |

OTHER PUBLICATIONS

Machine Translation of CN115027297A (Year: 2022) (Year: 2022).*
The World Intellectual Property Organization (WIPO) International Search Report for PCT/CN2022/123571 May 31, 2023 7 Pages (including translation).
The European Patent Office (EPO) The Extended European Search Report for Application No. 22960412.9 Jun. 24, 2025 7 Pages.

* cited by examiner

In a case that a power usage signal of a first load is received, control a charging apparatus to convert electrical energy input from a charging port or power battery into a first alternating current, and transmit the first alternating current to the first load    S601

CHARGING APPARATUS AND CONTROL METHOD THEREOF, AND ELECTRIC DEVICE AND POWER SUPPLY SYSTEM THEREOF

CROSS-REFERENCE TO RELATED APPLICATION

This application is a continuation of International Application No. PCT/CN2022/123571, filed on Sep. 30, 2022, the entire content of which is incorporated herein by reference.

TECHNICAL FIELD

This application relates to the field of power supply, and particularly, to a charging apparatus and a control method thereof, and an electric device and a power supply system thereof.

BACKGROUND

With the development of electronic technologies, electric devices carry an increasingly large number of electronic devices requiring power. For example, in the vehicle scenario, the number of in-vehicle devices on vehicles is increasing, and most of the in-vehicle devices are powered by in-vehicle power supply systems. The inventors of this application have found through research that current in-vehicle power supply systems suffer from severe electrical energy loss and low supply power when providing power to in-vehicle devices.

SUMMARY

This application provides a charging apparatus and a control method thereof, and an electric device and a power supply system thereof, which can solve the problems of severe electrical energy loss and low supply power when powering in-vehicle devices.

According to a first aspect, this application provides a charging apparatus, the charging apparatus is applied to an electric device, and the electric device includes a charging port and a power battery. The charging port is configured to be electrically connected to an external charging device. A first port of the charging apparatus is electrically connected to the charging port, a second port of the charging apparatus is electrically connected to the power battery, a third port of the charging apparatus is electrically connected to a first load, and the charging apparatus is configured to convert electrical energy input from the charging port or the power battery into a first alternating current, and transmit the first alternating current to the first load.

In the technical solution of this embodiment of this application, the charging apparatus directly converts the high voltage electrical energy input from the charging port or the power battery into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

In some embodiments, in a case that a second alternating current is input from the charging port, the charging apparatus receives, through the first port, the second alternating current input from the charging port, converts the second alternating current into the first alternating current, and transmits the first alternating current to the first load through the third port.

Thus, since the second alternating current input from the charging port has a high voltage and power, the charging apparatus directly converts the high voltage electrical energy input from the charging port into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

In some embodiments, in a case that the second alternating current is input from the charging port, the charging apparatus is further configured to convert the first alternating current or the second alternating current into a first direct current, and transmit the first direct current to the power battery through the second port, so as to charge the power battery.

Thus, in the case that the second alternating current is input from the charging port, not only can the first load be powered, but also the power battery can be charged.

In some embodiments, in a case that the power battery provides a second direct current to the charging apparatus, the charging apparatus receives, through the second port, the second direct current input from the power battery, converts the second direct current into the first alternating current, and transmits the first alternating current to the first load through the third port.

Thus, in the case that the power battery provides the second direct current to the charging apparatus, the charging apparatus can also directly convert the high voltage second direct current provided by the power battery into the first alternating current. This can ensure that the first alternating current has high power, that is, high supply power is guaranteed. Furthermore, since a current value of the first alternating current is relatively low, electrical energy loss of the first alternating current on a transmission line is small, which can reduce electrical energy loss on transmission lines.

In some embodiments, the charging apparatus includes an inverter, an input terminal of the inverter is electrically connected to the second port, an output terminal of the inverter is electrically connected to the third port, and the inverter is configured to convert the second direct current into the first alternating current.

Thus, the inverter provided in the charging apparatus can convert the high voltage second direct current provided by the power battery into the first alternating current. This satisfies the power needs of the first load in the power supply mode.

In some embodiments, the charging apparatus is in communication connection with a controller of the electric device, the charging apparatus is specifically configured to: under a condition that a start signal of the electric device sent by the controller has been received, convert electrical energy input from the charging port or the power battery into the first alternating current, and transmit the first alternating current to the first load.

Thus, when the electric device is started, the first load can be automatically powered, sparing the need to design a complicated control sequence and program. This also simplifies user operations and improves user experience.

In some embodiments, the electric device further includes a direct current-direct current converter, an input terminal of the direct current-direct current converter is electrically connected to the second port or the power battery, an output terminal of the direct current-direct current converter is electrically connected to a second load, and the direct current-direct current converter is configured to convert the first direct current output from the second port or the second direct current output from the power battery into a third direct current, and transmit the third direct current to the second load; and a voltage value of the third direct current is less than voltage values of the first direct current and the second direct current.

Thus, not only can power needs of the first load powered by alternating current be met, but also power needs of the second load powered by direct current can be met by disposing the direct current-direct current converter to convert the first direct current or the second direct current into the third direct current.

In some embodiments, the first load includes at least two first sub-loads, the electric device further includes a first power distribution box, the third port is electrically connected to an input terminal of the first power distribution box, and at least two output terminals of the first power distribution box are electrically connected to the at least two first sub-loads respectively.

Thus, with the first power distribution box disposed, power can be supplied to multiple first sub-loads simultaneously, meeting the power needs of the multiple first sub-loads on the electric device simultaneously.

In some embodiments, the electric device further includes a second power distribution box, an input terminal of the second power distribution box is electrically connected to the power battery, and an output terminal of the second power distribution box is electrically connected to a third load.

Thus, with the second power distribution box disposed, power can be supplied to multiple third loads simultaneously, meeting the power needs of the multiple third loads on the electric device simultaneously.

According to a second aspect, this application provides a power supply system of an electric device. The power supply system of an electric device includes: a charging port; a power battery; and the charging apparatus according to the first aspect, where a first port of the charging apparatus is electrically connected to the charging port, a second port of the charging apparatus is electrically connected to the power battery, and a third port of the charging apparatus is electrically connected to a first load.

In some embodiments, the electric device may include a vehicle, and the power supply system of an electric device may be an in-vehicle power supply system.

According to a third aspect, this application provides a control method of a charging apparatus, where the charging apparatus includes the charging apparatus according to the first aspect, and the control method includes: in a case that a power usage signal of a first load has been received, controlling the charging apparatus to convert electrical energy input from the charging port or the power battery into a first alternating current, and transmit the first alternating current to the first load.

In the technical solution of this embodiment of this application, the charging apparatus directly converts the high voltage electrical energy input from the charging port or the power battery into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

In some embodiments, the in a case that a power usage signal of a first load has been received, controlling the charging apparatus to convert electrical energy input from the charging port or the power battery into a first alternating current, and transmit the first alternating current to the first load includes: in a case that a second alternating current is input from the charging port, controlling the charging apparatus to convert a second alternating current input from the charging port into the first alternating current, and transmit the first alternating current to the first load through the third port.

Thus, since the second alternating current input from the charging port has a high voltage and power, the charging apparatus directly converts the high voltage electrical energy input from the charging port into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

In some embodiments, the in a case that a power usage signal of a first load has been received, controlling the charging apparatus to convert electrical energy input from the charging port or the power battery into a first alternating current, and transmit the first alternating current to the first load includes: in a case that the power battery provides a second direct current to the charging apparatus, controlling the charging apparatus to convert the second direct current input from the power battery into the first alternating current, and transmit the first alternating current to the first load through the third port.

Thus, in the case that the power battery provides the second direct current to the charging apparatus, the charging apparatus can also directly convert the high voltage second direct current provided by the power battery into the first alternating current. This can ensure that the first alternating current has high power, that is, high supply power is guaranteed. Furthermore, since a current value of the first alternating current is relatively low, electrical energy loss of the first alternating current on a transmission line is small, which can reduce electrical energy loss on transmission lines.

In some embodiments, the power usage signal of the first load and a start signal of an electric device are multiplexed.

Thus, when the electric device is started, the first load can be automatically powered, sparing the need to design a complicated control sequence and program. This also simplifies user operations and improves user experience.

According to a fourth aspect, this application provides an electric device, where the electric device includes the charging apparatus provided in the first aspect or the power supply system of an electric device provided in the second aspect.

In the charging apparatus and the control method thereof, and the electric device and the power supply system thereof provided in the embodiments of this application, the charging apparatus is applied to the electric device, and the electric device includes a charging port and a power battery. The charging port is configured to be electrically connected to an external charging device. A first port of the charging apparatus is electrically connected to the charging port, a second port of the charging apparatus is electrically connected to the power battery, a third port of the charging apparatus is electrically connected to a first load, and the charging apparatus is configured to convert electrical energy input from the charging port or the power battery into a first alternating current, and transmit the first alternating current to the first load. In the embodiments of this application, the charging apparatus directly converts the high voltage electrical energy input from the charging port or the power battery into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
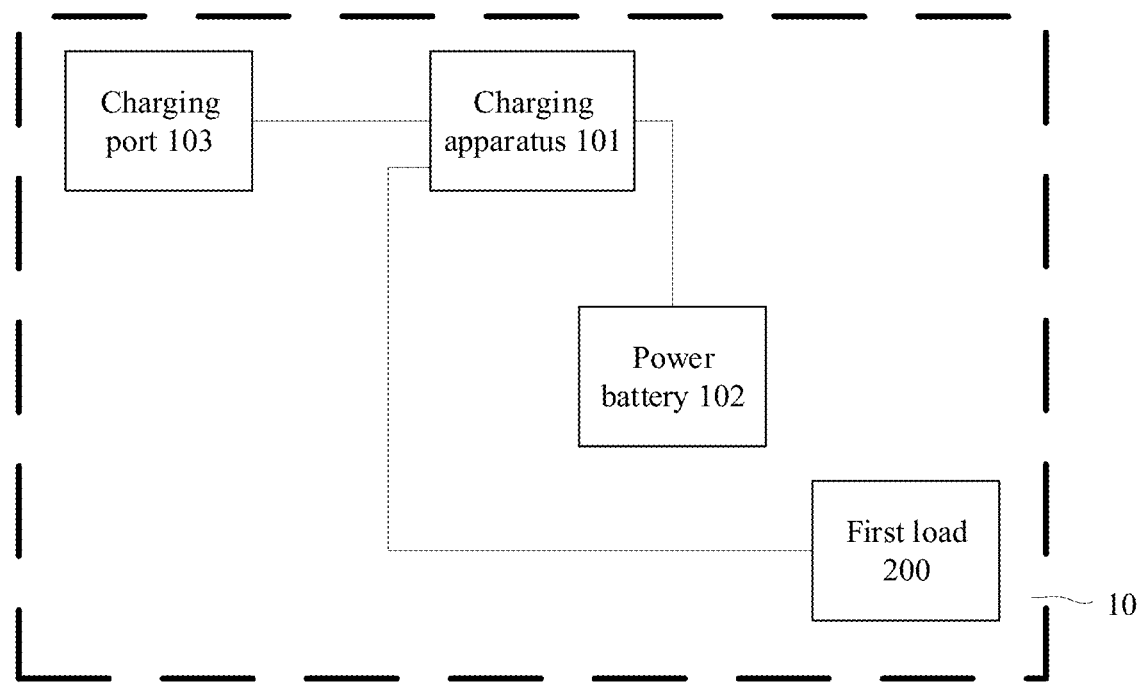
FIG. 1 is a schematic diagram of a circuit connection of a charging apparatus according to some embodiments of this application.

Reference signs in the specific embodiments are as follows:

101. charging apparatus, 102. power battery, 103. charging port, 200. first load, 10. power supply system of electric device;

501. direct current-direct current converter, 502. storage battery, 503. first power distribution box, 504. second power distribution box, 300. second load, 400. third load;

801. processor, 802. memory, 808. communication interface, and 810. bus.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

It should be noted that, unless otherwise stated, the technical terms or scientific terms used in the embodiments of this application should be in the ordinary meaning as understood by persons skilled in the field to which the embodiments of this application belong.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In addition, the technical terms "first" "second", and the like are merely for the purpose of description, and shall not be understood as any indication or implication of relative importance or any implicit indication of the number of technical features indicated. In the description of the embodiments of this application, "multiple" means at least two unless otherwise specifically stated.

In the description of the embodiments of this application, unless otherwise specified and defined explicitly, the technical terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in the embodiments of this application as appropriate to specific situations.

In the description of the embodiments of this application, unless otherwise expressly specified and defined, the first feature being "above" or "below" the second feature may mean that the first feature is in direct contact with the second feature or may mean that the first feature and the second feature come into contact indirectly through an intermediate medium. Moreover, that the first feature is "on", "above", or "on top of" the second feature may be that the first feature is directly and obliquely above the second feature, or only indicates that the level of the first feature is higher than the level of the second feature. That the first feature is "under", "below", or "beneath" the second feature may be that the first feature is directly and obliquely below the second feature, or only indicates that the level of the first feature is lower than the level of the second feature.

The inventors have noticed that current power supply systems for electric devices suffer from severe electrical energy loss and low supply power when powering electronic devices carried by electric devices. For example, in vehicle scenarios, current in-vehicle power supply systems suffer from severe electrical energy loss and low supply power when providing power to in-vehicle devices. Specifically, traditional vehicles are powered by 220 V in-vehicle alternating current, and this is achieved by using a direct current-direct current (DC-DC) module to output 12 V/24 V direct current, and then converting the 12 V/24 V low voltage direct current to 220 V alternating current. Since the current of the 12 V/24 V low voltage direct current is relatively large, and line loss is P=12R, the electrical energy loss of the low voltage direct current on the transmission line is large. Therefore, the line loss of this scheme of converting 12 V/24 V low voltage direct current to alternating current is large. In addition, due to the small power of the 12 V/24 V low voltage direct current, the power of the converted-to alternating current is also small, which leads to the problem of low supply power.

To solve the problems of severe electrical energy loss and low supply power during use of electronic devices carried by electric devices, the applicant has found that a charging apparatus can directly convert high voltage electrical energy input from a charging port or power battery into a first alternating current, ensuring that the first alternating current has high power, that is, high supply power is guaranteed. Furthermore, since a current value of the first alternating current is relatively low, electrical energy loss of the first alternating current on a transmission line is small, which can reduce electrical energy loss on transmission lines.

The charging apparatus provided in the embodiments of this application is described first below.

Referring to FIG. 1, FIG. 1 is a schematic diagram of a circuit connection of a charging apparatus according to some embodiments of this application. The charging apparatus 101 can be applied to an electric device. For example, in some specific embodiments, the electric device can be a vehicle. Accordingly, the charging apparatus 101 can include an on-board charger (On Board Charger, OBC). The vehicle may be an oil-fueled vehicle, a gas-powered vehicle, or a new energy vehicle. The new energy vehicle may be a battery electric vehicle, a hybrid electric vehicle, an extended-range electric vehicle, or the like. Certainly, the electric device can alternatively be other electric devices, and this is not limited in the embodiments of this application. The electric device is internally provided with a power battery 102, and the power battery 102 can be installed at the bottom, head, or tail of the electric device. The power battery 102 can be used to supply power to the electric device, for example, the power battery 102 can serve as an operating power source of the electric device. The charging apparatus 101 can be configured to convert an alternating current provided by an external charging device (such as an alternating current charging pile) into direct current for the power battery, so as to charge the power battery.

The electric device can further include a charging port 103, and the charging port 103 can be configured to be electrically connected to an external charging device to receive the alternating current provided by the external charging device.

The charging apparatus 101 can be provided with a first port, a second port, and a third port. For example, the first port can be an alternating current input port, and the second port can be a direct current input/output port, that is, the second port can be used as either a direct current input port or a direct current output port. The third port can be an alternating current output port.

The first port of the charging apparatus 101 can be electrically connected to the charging port 103, the second port of the charging apparatus 101 can be electrically connected to the power battery 102, and the third port of the charging apparatus 101 can be electrically connected to the first load 200. The first load 200 can be a device powered by alternating current. The first load 200 can be an in-vehicle device or an external device, and this is not limited in the embodiments of this application. In some specific examples, the first load 200 can include at least one of a sound system, an active suspension, an active anti-roll bar, or an in-vehicle refrigerator.

In this embodiment of this application, the charging apparatus 101 can be configured to convert the electrical energy input from the charging port 103 or the power battery 102 into the first alternating current, and transmit the first alternating current to the first load 200, so as to provide power to the first load 200. It should be noted that the first alternating current can be understood as alternating current and is referred to as the first alternating current just for the sake of distinction and description. The voltage value of the first alternating current can be flexibly adjusted according to actual needs. For example, the first alternating current can be 110 V alternating current, 220 V alternating current, 380 V alternating current, or alternating current of other voltage values.

Since the charging port 103 inputs high voltage alternating current, and the power battery 102 provides high voltage direct current, that is, the voltage value and power of the electrical energy input from the charging port 103 or the power battery 102 are both high, the charging apparatus 101 directly converts the high voltage electrical energy input from the charging port 103 or the power battery 102 into the first alternating current, ensuring that the first alternating current has high power, that is, high supply power is guaranteed. Since the voltage value of the first alternating current is high (that is, the current value is relatively low), as compared with 12V/24V low voltage direct current, the electrical energy loss of the first alternating current on the transmission line is small, which can reduce the electrical energy loss on the transmission line.

In the charging apparatus provided in this embodiment of this application, the charging apparatus is applied to the electric device, and the electric device includes the charging port and the power battery. The charging port is configured to be electrically connected to the external charging device. The first port of the charging apparatus is electrically connected to the charging port, the second port of the charging apparatus is electrically connected to the power battery, the third port of the charging apparatus is electrically connected to the first load, and the charging apparatus is configured to convert electrical energy input from the charging port or the power battery into the first alternating current, and transmit the first alternating current to the first load. In the embodiments of this application, the charging apparatus directly converts the high voltage electrical energy input from the charging port or the power battery into the first alternating current, ensuring that the first alternating current has high power, that is, ensuring high supply power. Furthermore, since the current value of the first alternating current is relatively low, electrical energy loss of the first alternating current on a transmission line is small, which can reduce electrical energy loss on transmission lines.

Figure 2:
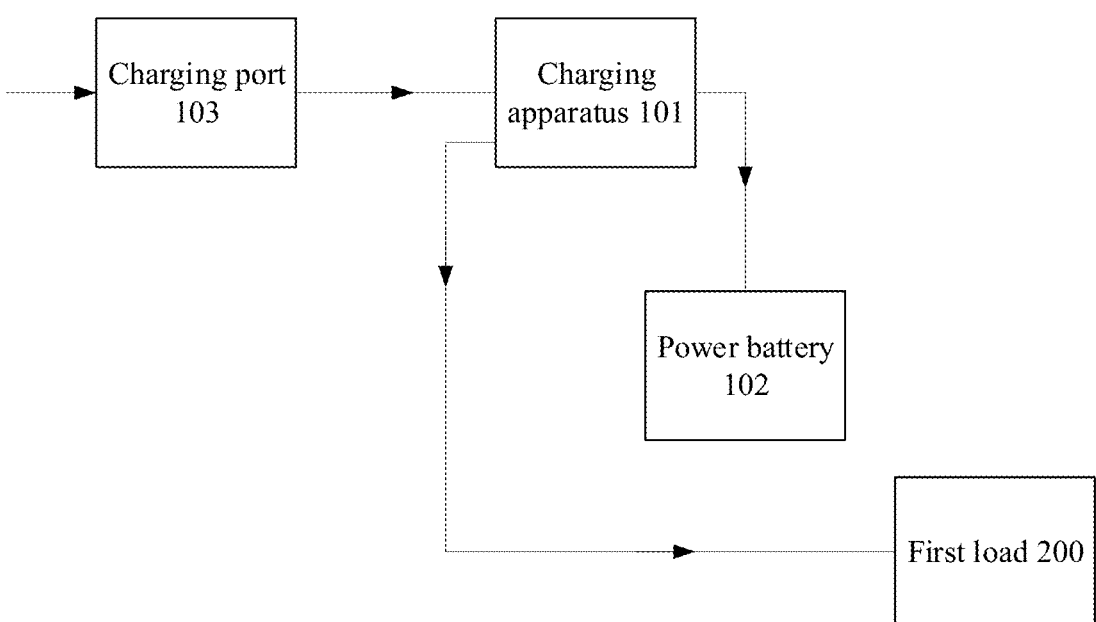
FIG. 2 is a working schematic diagram of a charging apparatus when a second alternating current is input from a charging port according to some embodiments of this application.

FIG. 2 is a working schematic diagram of a charging apparatus when a second alternating current is input from a charging port according to some embodiments of this application. As shown in FIG. 2, according to some embodiments of this application, optionally, in a case that a second alternating current is input from the charging port, the charging apparatus 101 can receive, through the first port, the second alternating current input from the charging port 103, convert the second alternating current into the first alternating current, and transmit the first alternating current to the first load 200 through the third port. That is to say, in the charging mode, the charging apparatus 101 can directly convert the second alternating current input from the charging port 103 into the first alternating current. The second alternating current can be 110 V, 220 V, or 380 V alternating current.

Thus, since the second alternating current input from the charging port has a high voltage and power, the charging apparatus directly converts the high voltage electrical energy input from the charging port into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

Still referring to FIG. 2, according to some embodiments of this application, optionally, in a case that the second alternating current is input from the charging port, the charging apparatus 101 may be further configured to convert the first alternating current or the second alternating current into a first direct current, and transmit the first direct current to the power battery 102 through the second port, so as to charge the power battery 102. That is to say, the charging apparatus 101 can convert the second alternating current input from the charging port 103 into the first direct current, or convert the first alternating current into the first direct current, and charge the power battery 102 with the first direct current.

Thus, in the case that the second alternating current is input from the charging port, not only can the first load be powered, but also the power battery can be charged.

Figure 3:
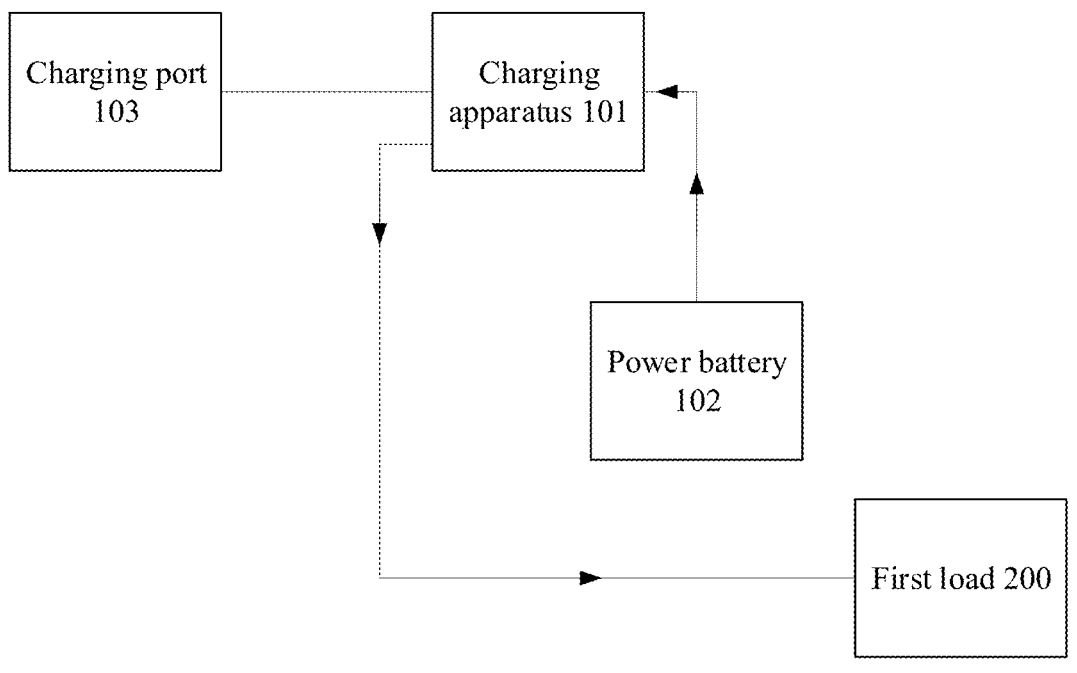
FIG. 3 is a working schematic diagram of a charging apparatus when a power battery provides a second direct current to the charging apparatus according to some embodiments of this application.

FIG. 3 is a working schematic diagram of a charging apparatus when a power battery provides a second direct current to the charging apparatus according to some embodiments of this application. As shown in FIG. 3, according to some embodiments of this application, optionally, in a case that the power battery 102 provides a second direct current to the charging apparatus 101, the charging apparatus 101 receives, through the second port, the second direct current input from the power battery 102, convert the second direct current into the first alternating current, and transmit the first alternating current to the first load 200 through the third port.

Thus, in the case that the power battery provides the second direct current to the charging apparatus, the charging apparatus can also directly convert the high voltage second direct current provided by the power battery into the first alternating current. This can ensure that the first alternating current has high power, that is, high supply power is guaranteed. Furthermore, since a current value of the first alternating current is relatively low, electrical energy loss of the first alternating current on a transmission line is small, which can reduce electrical energy loss on transmission lines.

In some specific embodiments, the charging apparatus 101 can be provided with an inverter (not shown in the figure), an input terminal of the inverter can be electrically connected to the second port, an output terminal of the inverter can be electrically connected to the third port, and the inverter can be configured to convert the second direct current into the first alternating current.

Thus, the inverter provided in the charging apparatus can convert the high voltage second direct current provided by the power battery into the first alternating current. This satisfies the power needs of the first load in the power supply mode.

Figure 4:
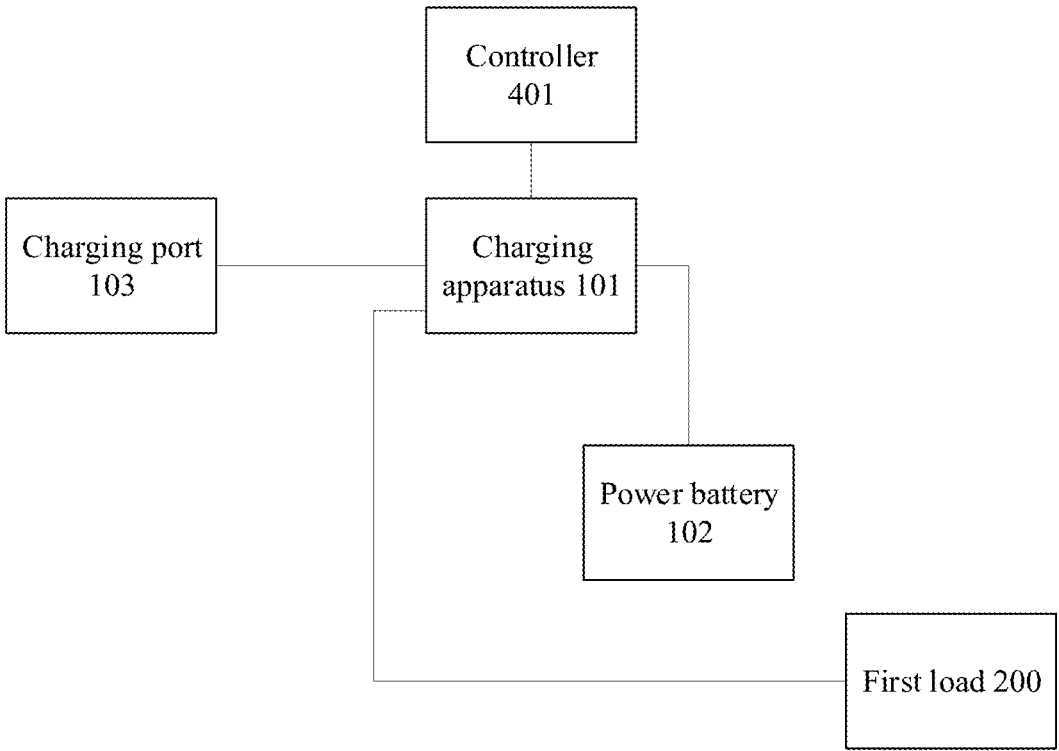
FIG. 4 is a schematic diagram of a circuit connection of a charging apparatus according to some other embodiments of this application.

FIG. 4 is a schematic diagram of a circuit connection of a charging apparatus according to some other embodiments of this application. As shown in FIG. 4, according to some embodiments of this application, optionally, the charging apparatus 101 can be in communication connection with a controller 401 of the electric device. For example, when the electric device is a vehicle, the controller 401 can be specifically an electronic control unit (Electronic Control Unit, ECU). The charging apparatus 101 can be specifically configured to: in a case that a start signal of the electric device sent by the controller 401 has been received, convert the electrical energy input from the charging port 103 or power battery 102 into the first alternating current and transmit the first alternating current to the first load 200.

As understood by those skilled in the art, the start signal of the electric device can include a KL15 signal, a key insertion signal, a key rotation signal, or an engine ignition signal, etc. That is, when the electric device is started, the charging apparatus 101 can convert the electrical energy input from the charging port 103 or the power battery 102 into the first alternating current and transmit the first alternating current to the first load 200.

Thus, when the electric device is started, the first load can be automatically powered, sparing the need to design a complicated control sequence and program. This also simplifies user operations and improves user experience.

Figures 5, 6:
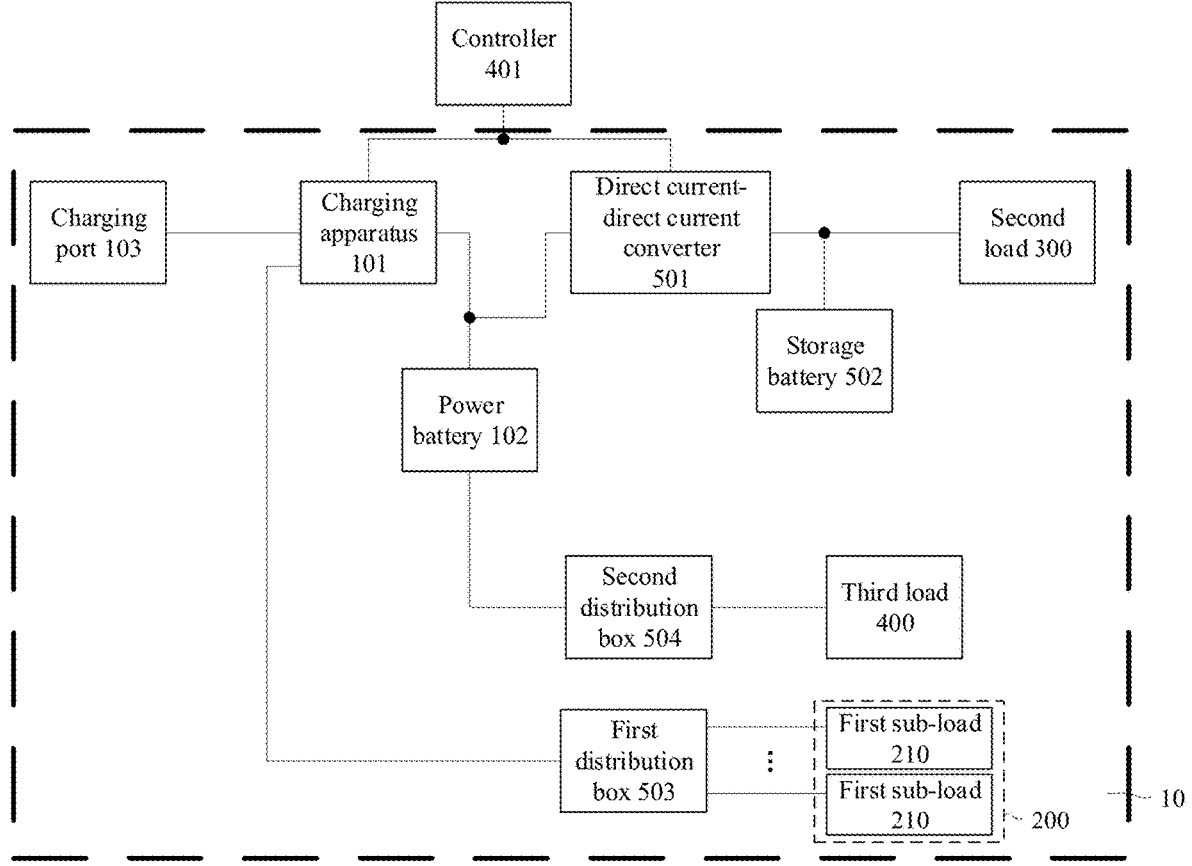
FIG. 5 is a schematic diagram of a circuit connection of a charging apparatus according to some other embodiments of this application.
FIG. 6 is a schematic flowchart of a control method of a charging apparatus according to an embodiment of this application.

FIG. 5 is a schematic diagram of a circuit connection of a charging apparatus according to some other embodiments of this application. As shown in FIG. 5, according to some embodiments of this application, optionally, the electric device can further include a direct current-direct current converter 501. An input terminal of the direct current-direct current converter 501 can be electrically connected to the second port of the charging apparatus 101 or the power battery 102, and an output terminal of the direct current-direct current converter 501 can be electrically connected to the second load 300. The direct current-direct current converter 501 can be configured to convert the first direct current output from the second port of the charging apparatus 101 or the second direct current output from the power battery 102 into a third direct current, and transmit the third direct current to the second load 300. A voltage value of the third direct current is less than voltage values of the first direct current and the second direct current. For example, the third direct current can be 12 V or 24 V direct current.

It should be noted that the voltage value of the first direct current and the voltage value of the second direct current can be the same or different, and this is not limited in the embodiments of this application.

The second load 300 can be a device powered by direct current. The second load 300 can be an in-vehicle device or an external device, and this is not limited in the embodiments of this application. In some specific examples, the second load 300 can include a sound system, a light, a controller, or a sunroof.

Thus, not only can power needs of the first load powered by alternating current be met, but also power needs of the second load powered by direct current can be met by disposing the direct current-direct current converter to convert the first direct current or the second direct current into the third direct current.

In some embodiments, the direct current-direct current converter 501 can alternatively be controlled by the start signal of the electric device, that is, in a case that the start signal of the electric device has been received, the direct current-direct current converter 501 converts the first direct current output from the second port of the charging apparatus 101 or the second direct current output from the power battery 102 into the third direct current, and transmits the third direct current to the second load 300.

Thus, when the electric device is started, the second load can be automatically powered without designing a complicated control sequence and program, simplifying user operations and improving user experience.

Still referring to FIG. 5, according to some embodiments of this application, optionally, the electric device can further include a storage battery 502, and the storage battery 502 can be electrically connected to both the output terminal of the direct current-direct current converter 501 and the second load 300. The direct current-direct current converter 501 can further be configured to transmit the third direct current to the storage battery 502 to charge the storage battery 502. The storage battery 502 can be configured to supply power to the second load 300, ensuring continuous and stable power supply to the second load 300.

Still referring to FIG. 5, according to some embodiments of this application, optionally, the first load 200 can include at least two first sub-loads 210. The at least two first sub-loads 210 can be the same or different. The electric device can further include a first power distribution box 503, the third port of the charging apparatus 101 can be electrically connected to an input terminal of the first power distribution box 503, and at least two output terminals of the first power distribution box 503 can be electrically connected to the at least two first sub-loads 210, respectively.

The first power distribution box 503 can divide one power supply branch into multiple power supply branches to simultaneously supply power to multiple first sub-loads 210. In addition, the first power distribution box 503 can also play a protective role. When the voltage or current of the first alternating current is too high, a protection device in the first power distribution box 503 performs cut-off, thereby protecting the first sub-loads 210 from the impact of over-voltage or over-current first alternating current.

Thus, with the first power distribution box 503 disposed, power can be supplied to multiple first sub-loads 210 simultaneously, meeting the power needs of the multiple first sub-loads on the electric device simultaneously.

Still referring to FIG. 5, according to some embodiments of this application, optionally, the electric device can further include a second power distribution box 504, an input terminal of the second power distribution box 504 can be electrically connected to the power battery 102, and an output terminal of the second power distribution box 504 can be electrically connected to the third load 400. One or more third loads 400 can be provided. The third load 400 can be a high voltage load, that is, the voltage level of the electrical energy required by the third load 400 is higher than that of the second load 300. For example, the third load 400 can be a device powered by direct current. The third load 400 can be an in-vehicle device or an external device, and this is not limited in the embodiments of this application. In some specific examples, the third load 400 can include a drive motor, a compressor, or a PTC heater, or the like.

When there are multiple third loads 400, the second power distribution box 504 can supply power to multiple third loads 400 simultaneously, meeting the power needs of the multiple third loads 400 on the electric device at the same time.

Based on the same technical concept as the charging apparatus 101 provided in the above embodiments, an embodiment of this application further provides a power supply system of an electric device. As shown in FIG. 1, the power supply system 10 of an electric device provided in this embodiment of this application can include a charging apparatus 101, a power battery 102, and a charging port 103. A first port of the charging apparatus 101 is electrically connected to the charging port 103, a second port of the charging apparatus 101 is electrically connected to the power battery 102, and a third port of the charging apparatus 101 is electrically connected to the first load 200.

In the power supply system of an electric device provided in this embodiment of this application, the charging apparatus directly converts the high voltage electrical energy input from the charging port or the power battery into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

In some specific embodiments, the electric device can be, for example, a vehicle. Accordingly, the power supply system of an electric device can specifically be an in-vehicle power supply system.

It should be noted that the power supply system 10 of an electric device provided in this embodiment of this application includes all the technical features of the charging apparatus 101 provided in the above embodiments. The specific structure and connection methods have been described in detail above and are not repeated here.

Based on the same technical concept as the charging apparatus 101 provided in the above embodiments, an embodiment of this application further provides a control method of a charging apparatus. The charging apparatus can include the charging apparatus 101 provided in the above embodiments.

FIG. 6 is a schematic flowchart of a control method of a charging apparatus according to an embodiment of this application. As shown in FIG. 6, the control method of a charging apparatus provided by this embodiment of this application can include the following step S601.

Step S601. In a case that a power usage signal of a first load has been received, control the charging apparatus to convert electrical energy input from a charging port or power battery into a first alternating current, and transmit the first alternating current to the first load.

The power usage signal of the first load is a signal used to control the power supply to the first load 200. The specific process of S601 has been described in detail above. Reference may be made to the description of the charging apparatus 101 in the above embodiments. Details are not repeated here.

In the control method of a charging apparatus provided in this embodiment of this application, the charging apparatus directly converts the high voltage electrical energy input from the charging port or the power battery into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

According to some embodiments of this application, optionally, S601 can specifically include the following step:

in a case that a second alternating current is input from the charging port, controlling the charging apparatus to convert a second alternating current input from the charging port into the first alternating current, and transmit the first alternating current to the first load through the third port.

Thus, since the second alternating current input from the charging port has a high voltage and power, the charging apparatus directly converts the high voltage electrical energy input from the charging port into the first alternating current, ensuring that the first alternating current has high power, that is, ensuring high supply power. Furthermore, since a current value of the first alternating current is relatively low, electrical energy loss of the first alternating current on a transmission line is small, which can reduce electrical energy loss on transmission lines.

According to some embodiments of this application, optionally, S601 can specifically include the following step:

in a case that the power battery provides a second direct current to the charging apparatus, controlling the charging apparatus to convert the second direct current input from the power battery into the first alternating current, and transmit the first alternating current to the first load through the third port.

Thus, in the case that the power battery provides the second direct current to the charging apparatus, the charging apparatus can also directly convert the high voltage second direct current provided by the power battery into the first alternating current. This can ensure that the first alternating current has high power, that is, high supply power is guaranteed. Furthermore, since a current value of the first alternating current is relatively low, electrical energy loss of the first alternating current on a transmission line is small, which can reduce electrical energy loss on transmission lines.

In some embodiments of this application, optionally, the power usage signal of the first load may be multiplexed with the start signal of the electric device. As described above, the start signal of the electric device includes but is not limited to a KL15 signal, a key insertion signal, a key rotation signal, an engine ignition signal, or the like.

Thus, when the electric device is started, the first load can be automatically powered, sparing the need to design a complicated control sequence and program. This also simplifies user operations and improves user experience.

It should be noted that the specific process of each of the above steps has been described in detail above. Reference may be made to the description of the charging apparatus 101 in the above embodiments. Details are not repeated here.

Based on the charging apparatus 101 and the power supply system 10 of an electric device provided in the above embodiments, this application provides an electric device. The electric device includes the charging apparatus 101 provided in the above embodiments or the power supply system 10 of an electric device provided in the above embodiments. In some specific embodiments, optionally, the electric device can be a vehicle. The vehicle may be an oil-fueled vehicle, a gas-powered vehicle, or a new energy vehicle. The new energy vehicle may be a battery electric vehicle, a hybrid electric vehicle, an extended-range electric vehicle, or the like.

Based on the control method of the charging apparatus provided in the above embodiments, correspondingly, this application further provides a specific implementation for an electronic device. Refer to the following embodiment.

Figure 7:
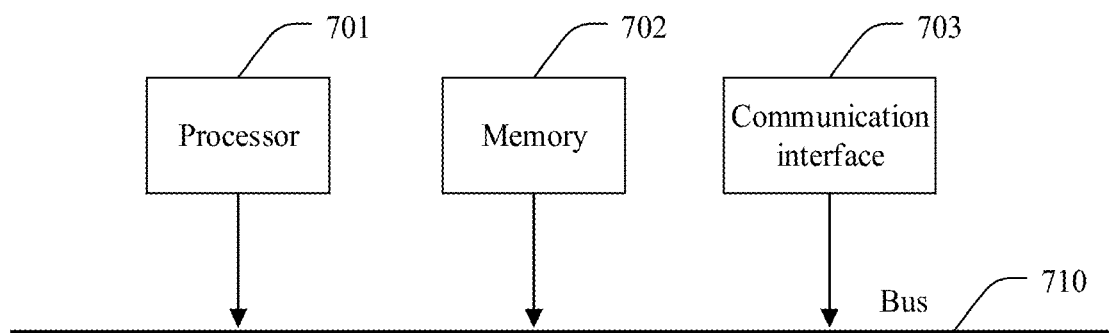
FIG. 7 is a schematic diagram of a hardware structure of an electronic device according to an embodiment of this application.

FIG. 7 is a schematic diagram of a hardware structure of an electronic device according to an embodiment of this application.

The electronic device can include a processor 701 and a memory 702 storing computer program instructions.

Specifically, the processor 701 can include a central processing unit (Central Processing Unit, CPU), or an application specific integrated circuit (Application Specific Integrated Circuit, ASIC), or can be configured to implement one or more integrated circuits of the embodiments of this application.

The memory 702 can include a large-capacity memory for data or instructions. For example, rather than limitation, the memory 702 can include a hard disk drive (Hard Disk Drive, HDD), a floppy disk drive, flash memory, an optical disk, a magneto-optical disk, a magnetic tape, or a universal serial bus (Universal Serial Bus, USB) drive, or a combination of two or more thereof. In an example, the memory 702 can include removable or non-removable (or fixed) media, or the memory 702 is non-volatile solid-state memory. The memory 702 can be inside or outside the integrated disaster recovery gateway device.

In an example, the memory 702 can be a read-only memory (Read Only Memory, ROM). In an example, the ROM can be a mask-programmed ROM, a programmable ROM (PROM), an erasable PROM (EPROM), an electrically erasable PROM (EEPROM), an electrically alterable ROM (EAROM), or flash memory, or a combination of two or more thereof.

The memory 702 can include read-only memory (ROM), random access memory (RAM), disk storage media devices, optical storage media devices, flash memory devices, electrical, optical, or other physical/tangible storage media storage devices. Therefore, typically, the memory includes one or more tangible (non-transitory) computer-readable storage media (for example, memory devices) encoded with software including computer-executable instructions, and when such software is executed (for example, by one or more processors), it is operable to perform operations referenced in the methods described according to one aspect of this application.

The processor 701 reads and executes the computer program instructions stored in the memory 702 to implement the methods/steps in the embodiments shown in FIG. 6 or FIG. 7 and achieve the corresponding technical effects of the methods/steps executed in the examples shown in FIG. 6 or FIG. 7. Details are not repeated here for brevity.

In an example, the electronic device can further include a communication interface 703 and a bus 710. As shown in FIG. 7, the processor 701, memory 702, and communication interface 703 are connected via the bus 710 to complete mutual communication.

The communication interface 703 is mainly configured to realize communication between various modules, apparatuses, units, and/or devices in the embodiments of this application.

The bus 710 includes hardware, software, or both, coupling the components of the electronic device together. For example, rather than limitation, the bus can include an accelerated graphics port (Accelerated Graphics Port, AGP) or other graphics bus, an extended industry standard architecture (Extended Industry Standard Architecture, EISA) bus, a front side bus (Front Side Bus, FSB), a hyper transport (Hyper Transport, HT) interconnect, an industry standard architecture (Industry Standard Architecture, ISA) bus, an infinite bandwidth interconnect, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus, or other suitable buses, or a combination of two or more of these buses. Where appropriate, the bus 710 can include one or more buses. Although the embodiments of this application describe and show specific buses, this application contemplates any suitable bus or interconnection.

In addition, in combination with the control method of a charging apparatus in the above embodiments, the embodiments of this application can provide a computer-readable storage medium for implementation. The computer-readable storage medium stores a computer program instruction. When the computer program instruction is executed by a processor, any one of the control methods of a charging apparatus in the above embodiments is implemented. Examples of the computer-readable storage medium include a non-transitory computer-readable storage medium, such as an electronic circuit, a semiconductor memory device, a ROM, a random access memory, a flash memory, an erasable ROM (EROM), a floppy disk, a CD-ROM, an optical disk, and a hard disk.

It should be clarified that this application is not limited to the specific configurations and processes described above and shown in the figures. For brevity, a detailed description of known methods is omitted herein. In the foregoing embodiments, several specific steps are described and shown as examples. However, the method processes of this application are not limited to the specific steps described and shown, and those skilled in the art can make various changes, modifications, and additions, or change the order of the steps within the spirit of this application.

The functional blocks shown in the foregoing structural block diagrams may be implemented as hardware, software, firmware, or a combination thereof. When implemented as hardware, it may be, for example, an electronic circuit, an application specific integrated circuit (Application Specific Integrated Circuit, ASIC), appropriate firmware, a plug-in, a function card, or the like. When implemented as software, elements of this application are programs or code segments used to perform required tasks. The programs or code segments may be stored in a machine-readable medium, or transmitted over a transmission medium or a communication link by a data signal carried in a carrier wave. The "machine-readable medium" may include any medium capable of storing or transmitting information. Examples of the machine-readable medium include an electronic circuit, a semiconductor memory device, an ROM, a flash memory, an erasable ROM (EROM), a floppy disk, a CD-ROM, an optical disk, a hard disk, a fiber optic medium, a radio frequency (Radio Frequency, RF) link, and the like. The code segments may be downloaded via a computer network such as the Internet or an intranet.

It should be further noted that the example embodiments mentioned in this application describe some methods or systems based on a series of steps or devices. However, this application is not limited to the order of the foregoing steps. To be specific, the steps may be performed in the order mentioned in the embodiments, or may be performed in an order different from that in the embodiments, or several steps may be performed at the same time.

The various aspects of this application have been described above with reference to the flowcharts and/or block diagrams of the method, the apparatus (system), and the computer program product according to the embodiments of this application. It should be understood that each block in the flowcharts and/or block diagrams and a combination of blocks in the flowcharts and/or block diagrams can be implemented by computer program instructions. These computer program instructions can be provided to a processor of a general-purpose computer, a dedicated computer, or another programmable data processing apparatus to produce a machine, so that these instructions executed by the processor of the computer or another programmable data processing apparatus enable the implementation of the functions/actions specified in one or more blocks of the flowchart and/or block diagram. Such processor may be, but is not limited to, a general-purpose processor, a dedicated processor, a special application processor, or a field programmable logic circuit. It should be also understood that each block in the block diagrams and/or the flowcharts and a combination of the blocks in the block diagrams and/or the flowcharts may be implemented by a dedicated hardware for executing a specified function or action or may be implemented by a combination of dedicated hardware and computer instructions.

The foregoing descriptions are merely specific embodiments of this application. Persons skilled in the art may clearly understand that, for ease and brevity of description, for specific working processes of the system, module, and unit described above, reference may be made to the corresponding processes in the foregoing method embodiments. Details are not described herein again. It should be understood that the protection scope of this application is not limited to thereto. Various equivalent modifications or replacements readily figured out by persons skilled in the art within the technical scope disclosed in this application shall fall within the protection scope of this application.

What is claimed is:

1. A charging apparatus onboard an electric vehicle, comprising a first port electrically connected to a charging port of the electric vehicle, the charging port being configured to be electrically connected to an external charging device;

a second port electrically connected to a power battery of the electric vehicle; and a third port electrically connected to a first load;

wherein the charging apparatus is configured to convert electrical energy input from the charging port or the power battery into a first alternating current, and transmit the first alternating current to the first load, wherein the first load comprises at least two first sub-loads, the electric vehicle further comprises a first power distribution box, the third port is electrically connected to an input terminal of the first power distribution box, and at least two output terminals of the first power distribution box are electrically connected to the at least two first sub-loads respectively, wherein the first power distribution box comprises a protection device configured to cut off transmission of the first alternating current to the at least two first sub-loads in response to an over-voltage or an over-current of the first alternating current, and wherein the electrical energy is not converted into a direct current when the electrical energy is input from the charging port in a form of an alternating current.

2. The charging apparatus according to claim 1, wherein the charging apparatus is further configured to, in a case that a second alternating current is input from the charging port, receive, through the first port, the second alternating current input from the charging port, convert the second alternating current into the first alternating current, and transmit the first alternating current to the first load through the third port.

3. The charging apparatus according to claim 2, wherein the charging apparatus is further configured to, in a case that the second alternating current is input from the charging port, convert the first alternating current or the second alternating current into a first direct current, and transmit the first direct current to the power battery through the second port, so as to charge the power battery.

4. The charging apparatus according to claim 1, wherein the charging apparatus is further configured to, in a case that the power battery provides a second direct current to the charging apparatus, receive, through the second port, the second direct current input from the power battery, convert the second direct current into the first alternating current, and transmit the first alternating current to the first load through the third port.

5. The charging apparatus according to claim 4, further comprising:

an inverter, wherein an input terminal of the inverter is electrically connected to the second port, an output terminal of the inverter is electrically connected to the third port, and the inverter is configured to convert the second direct current into the first alternating current.

6. The charging apparatus according to claim 1, wherein the charging apparatus is in communication connection with a controller of the electric vehicle, and is specifically configured to:

under a condition that a start signal of the electric vehicle sent by the controller has been received, convert electrical energy input from the charging port or the power battery into the first alternating current, and transmit the first alternating current to the first load.

7. The charging apparatus according to claim 1, wherein:

the electric vehicle further comprises a direct current-direct current converter, an input terminal of the direct current-direct current converter is electrically connected to the second port or the power battery, an output terminal of the direct current-direct current converter is electrically connected to a second load, and the direct current-direct current converter is configured to convert the first direct current output from the second port or the second direct current output from the power battery into a third direct current, and transmit the third direct current to the second load; and a voltage value of the third direct current is less than voltage values of the first direct current and the second direct current.

8. The charging apparatus according to claim 1, wherein the electric vehicle further comprises a second power distribution box, an input terminal of the second power distribution box is electrically connected to the power battery, and an output terminal of the second power distribution box is electrically connected to a third load.

9. A power supply system of the electric vehicle, comprising:

the charging port;

the power battery; and the charging apparatus according to claim 1.

10. A control method of the charging apparatus according to claim 1, the control method comprising:

in a case that a power usage signal of a first load has been received, controlling the charging apparatus to convert electrical energy input from the charging port or the power battery into the first alternating current, and transmit the first alternating current to the first load.

11. The control method according to claim 10, wherein in the case that the power usage signal of the first load has been received, controlling the charging apparatus to convert electrical energy input from the charging port or the power battery into the first alternating current, and transmit the first alternating current to the first load comprises:

in a case that a second alternating current is input from the charging port, controlling the charging apparatus to convert a second alternating current input from the charging port into the first alternating current, and transmit the first alternating current to the first load through the third port.

12. The control method according to claim 10, wherein in the case that the power usage signal of the first load has been received, controlling the charging apparatus to convert electrical energy input from the charging port or the power battery into the first alternating current, and transmit the first alternating current to the first load comprises:

in a case that the power battery provides a second direct current to the charging apparatus, controlling the charging apparatus to convert the second direct current input from the power battery into the first alternating current, and transmit the first alternating current to the first load through the third port.

13. The control method according to claim 10, wherein the power usage signal of the first load and a start signal of an electric vehicle are multiplexed.

14. The electric vehicle, comprising the charging apparatus according to claim 1.

15. The charging apparatus according to claim 1, the first alternating current is at a mains level voltage.

\* \* \* \* \*